(12) United States Patent
Cavaliere

(10) Patent No.: US 9,077,473 B2
(45) Date of Patent: Jul. 7, 2015

(54) OPTICAL NETWORK APPARATUS FOR SELF-SEEDED COMMUNICATIONS

(71) Applicant: Telefonaktiebolaget LM Ericsson (publ), Stockholm (SE)

(72) Inventor: Fabio Cavaliere, Vecchiano (IT)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 14 days.

(21) Appl. No.: 13/814,017

(22) PCT Filed: Jan. 4, 2013

(86) PCT No.: PCT/EP2013/050093
§ 371 (c)(1),
(2) Date: Nov. 27, 2013

(87) PCT Pub. No.: WO2014/106542
PCT Pub. Date: Jul. 10, 2014

(65) Prior Publication Data
US 2014/0193156 A1 Jul. 10, 2014

(51) Int. Cl.
*H04J 14/02* (2006.01)
(52) U.S. Cl.
CPC ......... *H04J 14/0201* (2013.01); *H04J 14/0205* (2013.01); *H04J 14/0202* (2013.01)
(58) Field of Classification Search
CPC .............. H04J 14/0201; H04J 14/0204; H04J 14/0205; H04J 14/021
USPC .................................. 398/82, 83, 85, 86, 152
See application file for complete search history.

(56) References Cited

U.S. PATENT DOCUMENTS 5,953,470 A * 9/1999 Toyohara .......................... 385/24
6,084,694 A * 7/2000 Milton et al. .................... 398/83
(Continued)

FOREIGN PATENT DOCUMENTS

WO    WO 2012/034604    3/2012

OTHER PUBLICATIONS

Presi et al., "Stable self-seeding of R-SOAs for WDM-PONs", *OSA/OFC/NFOEC* 2011, 3 pages.
(Continued)

*Primary Examiner* — Dalzid Singh
(74) *Attorney, Agent, or Firm* — Baker Botts, LLP

(57) ABSTRACT

Optical network apparatus comprises an optical add drop multiplexer (10) comprising an optical signal input (11) and an optical signal output (12). An add input path (15) is connected to the optical signal output (12) for receiving a wavelength channel to be added. A drop output path (16) is connected to the optical signal input (11) for outputting a wavelength channel to be dropped. A through signal path (18) is connected between the optical signal input (11) and the optical signal output (12). An optical filter (20) is positioned in the add input path (15) for filtering an optical signal received on the add input path (15) from an optical terminal (40). A reflective device (30) in the add input path (15) is arranged to form an optical seed signal by returning at least a portion of the filtered optical signal. The optical seed signal is for use in seeding an optical transmitter at the optical terminal (40). The reflective device (30) is positioned between the optical filter (20) and the optical signal output (12). The drop output path (16) and the through signal path (18) bypass the reflective device (30).

15 Claims, 12 Drawing Sheets

(56) References Cited

U.S. PATENT DOCUMENTS 6,208,441 B1 * 3/2001 Jones et al. .................. 398/87
2008/0013950 A1 * 1/2008 Boudreault et al. ............ 398/59

OTHER PUBLICATIONS

PCT Notification of Transmittal of the International Search Report and the Written Opinion of the International Searching Authority, or the Declaration for International application No. PCT/EP2013/050093, Sep. 13, 2013.

"Directly Modulated Self-Seeding Reflective Semiconductor Optical Amplifiers as Colorless Transmitters in Wavelength Division Multiplexed Passive Optical Networks" by Wong et al., 2007.

\* cited by examiner

US 9,077,473 B2

OPTICAL NETWORK APPARATUS FOR SELF-SEEDED COMMUNICATIONS

This application is the U.S. national phase of International Application No. PCT/EP2013/050093 filed 4 Jan. 2013 which designated the U.S., the entire content of which is hereby incorporated by reference.

TECHNICAL FIELD

This invention relates to optical network apparatus comprising an optical add drop multiplexer and to an optical add drop multiplexer which allow self-seeding of optical terminals. This invention also relates to a corresponding method of processing optical signals.

BACKGROUND

Communications traffic at network edges is increasing over time due to the rising demand for a range of high-bandwidth services by business and residential customers. This rising demand places an increasing requirement on access networks to deliver those services.

One type of network suitable for high-bandwidth services is a Passive Optical Network (PON). It is desirable that apparatus deployed at remote terminals of the network is "colourless". This means that the apparatus deployed at remote terminals is not configured to operate at a particular wavelength but, instead, is capable of operating across a range of wavelengths. This allows an economy of scale in manufacturing the terminal apparatus. The configuration of the operating wavelength of a terminal is made by other apparatus in the network, external to the terminal There are several different approaches to WDM-PONs with colourless transceivers. One approach is called self-seeding and is described in the paper "Directly Modulated Self-Seeding Reflective Semiconductor Optical Amplifiers as Colourless Transmitters in Wavelength Division Multiplexed Passive Optical Networks", Wong et al, Journal of Lightwave Technology, Vol. 25, No. 1, January 2007. A Reflective Semiconductor Optical Amplifier (R-SOA) at a terminal generates broadband amplified spontaneous emission (ASE) light. The light is transmitted upstream. A wavelength division multiplexer (WDM) such as an Arrayed Waveguide Grating (AWG) at a remote node reflects a spectral slice of the broadband light back to the terminal for use as a seeding light. This locks the transmitted wavelength of the R-SOA. The R-SOA is directly modulated with upstream data. The operating wavelength of a remote terminal is determined by the WDM port that the terminal is connected to.

An improvement of the self seeded system uses a polarisation insensitive reflective device, such as a Faraday mirror, to reflect back to the transmitter a given portion of the emitted light, in order to create a sort of distributed cavity laser. Polarisation insensitivity helps to to ensure a stable performance. This improvement is described in WO 2012/034604 A1.

The use of self-seeding has so far been limited to networks with a tree-and-branch topology.

SUMMARY

An aspect of the present invention provides an optical network apparatus comprising an optical add drop multiplexer. The optical add drop multiplexer comprises an optical signal input for receiving an optical input signal comprising at least one wavelength channel. The optical add drop multiplexer further comprises an optical signal output for outputting an optical signal for onward transmission. The optical add drop multiplexer further comprises a through signal path connected between the optical signal input and the optical signal output for carrying a wavelength channel of the optical signal for onward transmission. The optical network apparatus further comprises an add input path connected to the optical signal output for receiving a wavelength channel to be added. The optical network apparatus further comprises a drop output path connected to the optical signal input for outputting a wavelength channel to be dropped. The optical network apparatus further comprises an optical filter positioned in the add input path for filtering an optical signal received on the add input path from an optical terminal to form a filtered optical signal. The optical network apparatus further comprises a reflective device positioned in, or connected to, the add input path arranged to form an optical seed signal by returning at least a portion of the filtered optical signal. The optical seed signal is for use in seeding an optical transmitter at the optical terminal The reflective device is positioned between the optical filter. The optical signal output and the drop output path and the through signal path bypass the reflective device.

Advantageously, the optical filter comprises an optical wavelength division multiplex filter having a first port connected to the add input path. The reflective device can be positioned in the add input path between the optical wavelength division multiplex filter and the optical add drop multiplexer.

Advantageously, the optical wavelength division multiplex filter can have a second port which is connected to the drop output path.

Advantageously, an optical isolator is positioned in the drop output path between the optical add drop multiplexer and the optical wavelength division multiplex filter.

Advantageously, the reflective device is arranged to modify a polarisation of the optical seed signal with respect to a polarisation of the filtered optical signal.

Advantageously, the reflective device can comprise a partially-reflective device positioned in the add input path which is arranged to reflect a portion of the filtered optical signal received for return to the optical terminal as the optical seed signal. Alternatively, the reflective device can comprise a reflective device which is connected to an optical coupler positioned in the add input path, wherein the reflective device is arranged to reflect the filtered optical signal for return to the optical terminal via the optical coupler as the optical seed signal.

Advantageously, the partially-reflective device comprises a partially-reflective Faraday mirror and the reflective device comprises a Faraday mirror. The term "partially-reflective" means that a first portion of the light arriving at the device is reflected while a second portion of the light arriving at the device is transmitted. This may also be called a semi-reflective device, although the portion of light reflected by the device can be a value other than 50%.

Advantageously, the optical add drop multiplexer is a reconfigurable optical add drop multiplexer.

Advantageously, the optical add drop multiplexer comprises an add filter arranged to pass a selected wavelength channel for adding to the optical signal for onward transmission and the optical filter is the add filter. Advantageously, the through path for the optical signal for onward transmission bypasses the add filter.

Advantageously, the optical network apparatus further comprises an optical terminal with a transmitter arranged to transmit an optical signal to the add input path and to receive an optical seed signal for use in seeding the transmitter.

Advantageously, the optical terminal further comprises a receiver arranged to receive an optical signal via the drop output path.

An aspect of the invention provides an optical add drop multiplexer comprising an optical signal input for receiving an optical input signal comprising at least one wavelength channel. The optical add drop multiplexer further comprises an optical signal output for outputting an optical signal for onward transmission. The optical add drop multiplexer further comprises an add input path connected to the optical signal output for receiving a wavelength channel to be added. The optical add drop multiplexer further comprises a drop output path connected to the optical signal input for outputting a wavelength channel to be dropped. The optical add drop multiplexer further comprises a through signal path connected between the optical signal input and the optical signal output for carrying a wavelength channel of the optical signal for onward transmission. The optical add drop multiplexer further comprises an optical filter positioned in the add input path for filtering an optical signal received on the add input path from an optical terminal to form a filtered optical signal. The optical add drop multiplexer further comprises a reflective device positioned in, or connected to, the add input path arranged to form an optical seed signal by returning at least a portion of the filtered optical signal. The optical seed signal is for use in seeding an optical transmitter at the optical terminal The reflective device is positioned between the optical filter and the optical signal output. The drop output path and the through signal path bypass the reflective device.

An aspect of the invention provides a method of processing optical signals at optical network apparatus comprising an optical add drop multiplexer, the optical add drop multiplexer comprising an optical signal input for receiving an optical input signal comprising at least one wavelength channel and a through signal path connected between the optical signal input and the optical signal output for carrying a wavelength channel of the optical signal for onward transmission. The optical network apparatus further comprises an add input path connected to the optical signal output for receiving a wavelength channel to be added and a drop output path connected to the optical signal input for outputting a wavelength channel to be dropped. The method comprises filtering an optical signal received from an optical terminal via the add input path. The method further comprises forming an optical seed signal using a reflective device positioned in, or connected to, the add input path by returning at least a portion of the optical signal received from the optical terminal. The optical seed signal is for use in seeding an optical transmitter at the optical terminal The method further comprises outputting, via the drop output path, a wavelength channel of an optical signal to be dropped. The method further comprises passing, via the through signal path, a wavelength channel of the optical signal for onward transmission. The outputting, via the drop output path, of the wavelength channel of the optical signal to be dropped and the passing, via the through signal path, of the wavelength channel of the optical signal for onward transmission bypass the reflective device.

Advantageous features may be combined as appropriate, as would be apparent to a skilled person, and may be combined with any of the aspects of the invention.

BRIEF DESCRIPTION OF THE DRAWINGS

Embodiments of the invention will be described, by way of example only, with reference to the accompanying drawings in which.

DETAILED DESCRIPTION

Figure 1:
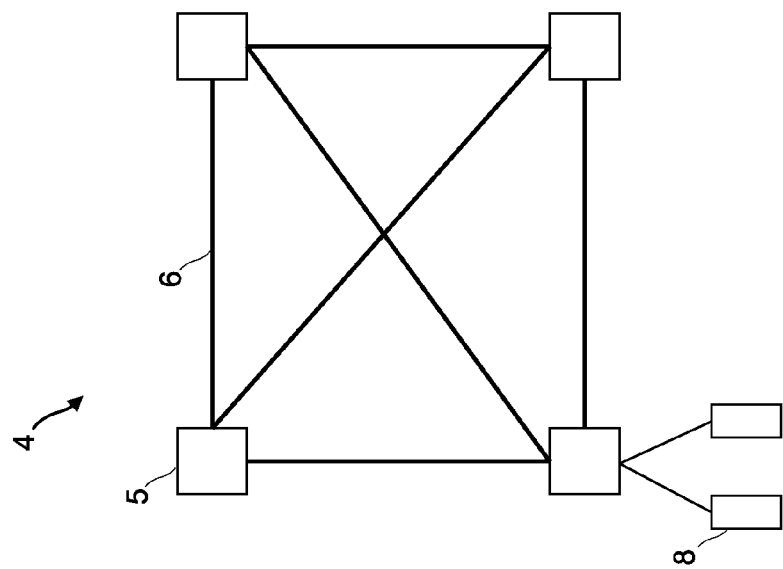
FIG. 1 shows an example of a ring topology and a meshed topology for an optical network with an optical add drop multiplexers at each node.
Figure 1:
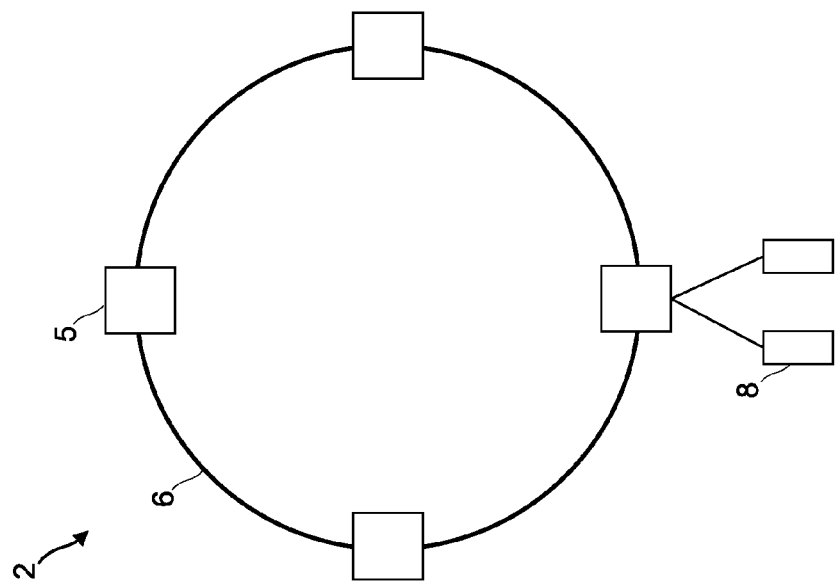

FIG. 1 shows two examples of network topologies that can be used in optical communication networks. These topologies can be used in metro networks which are used to carry traffic across a wide geographical area, although embodiments are not limited to metro networks. Optical network 2 has a ring topology. A set of nodes 5 are joined by optical links 6. The ring can be uni-directional or bi-directional. In a uni-directional ring, links 6 carry traffic in one direction, e.g. clockwise, around the ring between nodes 5. In a bi-directional ring, traffic can travel in either direction around the ring. Optical network 4 has a meshed topology. A set of nodes 5 are joined by optical links 6 which form a mesh of paths between nodes 5. Typically, traffic can flow in forward and reverse directions between each pair of nodes 5. In the networks 2, 4, terminals 8 can connect to nodes 5 of the ring. Nodes 5 can also connect to other traffic sources/destinations, such as other networks. At least some of the topologies can help to more efficiently distribute traffic and can improve resilience to failures. A network may comprise a hybrid combination of ring and mesh topologies, or some other topology.

Traffic can be carried on any of the networks 2, 4, of FIG. 1 using a set of wavelength channels. An Optical Add Drop Multiplexer (OADM) can be provided at each of the nodes 5. An OADM can add a wavelength channel. This means that a wavelength channel used by a terminal 8 or other source is added to the set of wavelength channels flowing towards the next node 5 of network 2, 4. An OADM can selectively drop a channel. This means that a wavelength channel is received at the OADM on a link 6 and then forwarded to the terminal 8.

An optical terminal 8 can be called an Optical Network Terminal (ONT), Optical Network Unit (ONU) or Tail End Equipment (TEE). Equipment at a Central Office can be called Head End Equipment (HEE).

There are several different types of OADM. In broad terms, OADMs can be fixed or reconfigurable. A reconfigurable OADM has the possibility to change the set of wavelengths that can be added or dropped at the node.

Figure 2:
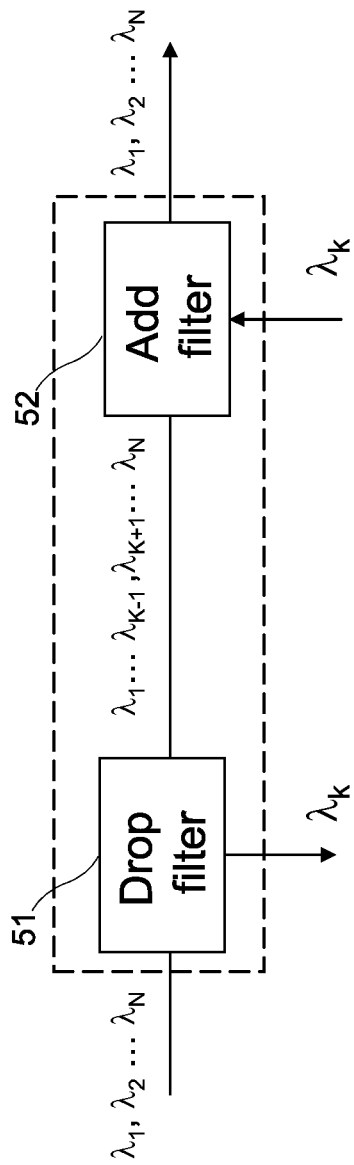
FIG. 2 shows a conventional configuration of a fixed optical add drop multiplexer with a drop filter and an add filter.

The working principle of a conventional fixed OADM (FOADM) 60 is shown in FIG. 2. A pair of optical filters 51, 52 are positioned in series along an optical path between an input and output. A set of wavelength channels $(\lambda_1, \lambda_2, \ldots \lambda_N)$ is received at a first optical filter 51, called a drop filter. The drop filter 51 routes a predetermined wavelength $(\lambda_k)$ to a drop port, allowing the other wavelengths $(\lambda_1, \ldots \lambda_{K-1}, \lambda_{K+1} \ldots \lambda_N)$ to pass undisturbed. A second filter 52 (or a coupler) is used to add a wavelength $(\lambda_k)$ carrying new traffic. FIG. 2 shows the same wavelength $\lambda_k$ dropped at filter 51 and added at filter 52 but it will be appreciated that, in general, any first wavelength can be dropped by the first filter 51 and any second wavelength can be added by the second filter 52, provided that second wavelength is not already in use. The set of wavelength channels $(\lambda_1, \lambda_2, \ldots \lambda_N)$ is output to the next node. The scheme can be generalised to add/drop multiple wavelengths.

Figure 3:
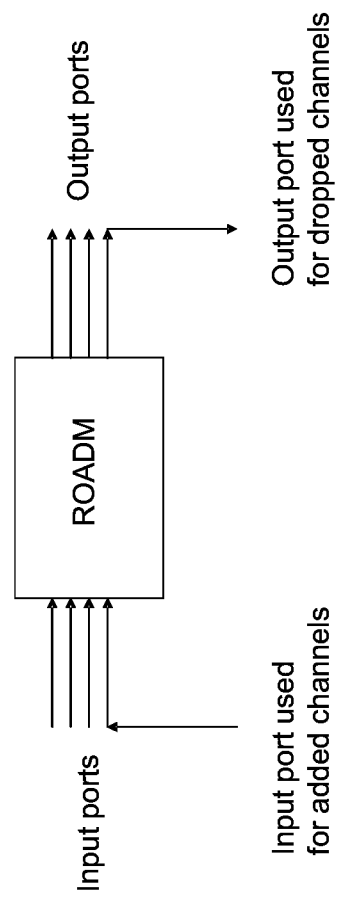
FIG. 3 shows a conventional configuration of a reconfigurable optical add drop multiplexer.

The working principle of a reconfigurable OADM (ROADM) is shown in FIG. 3. FIG. 3 shows an example based on a wavelength selective switch (WSS), which is an optical device able to independently route one of the wavelengths present at one of the input ports to one arbitrary output port. One of the input ports is used as local drop port and one of the output ports is used as local add port.

Figure 4:
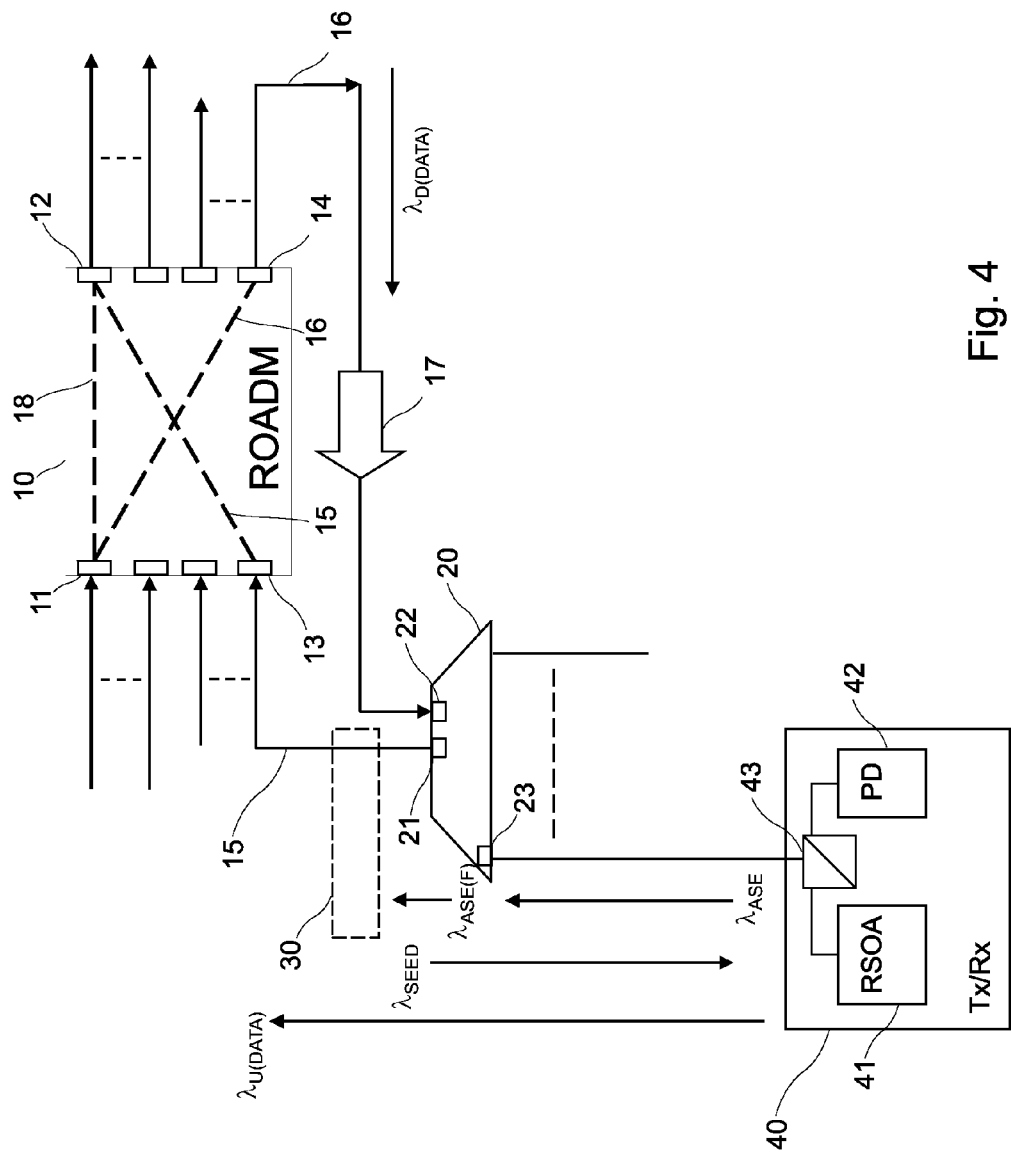
FIG. 4 shows an embodiment of optical network apparatus comprising an optical add drop multiplexer which supports self-seeding.

FIG. 4 shows an optical network apparatus comprising a reconfigurable optical add drop multiplexer (ROADM) 10. The ROADM 10 comprises an optical signal input 11 for receiving an optical input signal comprising at least one wavelength channel. The ROADM 10 comprises an optical signal output 12 for outputting an optical signal for onward transmission. An add input path 15 is connected to the optical signal output 12. In this embodiment the add input path 15 comprises a portion which is internal to the ROADM, between an add input 13 of the ROADM 10 and the optical signal output 12, and a portion which is external to the ROADM. The external portion of the add input path 15 carries signals leading to the ROADM. The add input path 15 is for receiving a wavelength channel to be added at the ROADM 10. The ROADM 10 comprises a drop output path 16 which is connected to the optical signal input 11. In this embodiment the drop output path 16 comprises a portion which is internal to the ROADM, between the optical signal input 11 and a drop output 14 of the ROADM 10, and a portion which is external to the ROADM. The external portion of the drop output path 16 carries signals leading from the ROADM 10. The drop output path 16 is for outputting a wavelength channel to be dropped at the ROADM 10. A through signal path 18 is connected between the optical signal input 11 and the optical signal output 12. The through signal path 18 is for carrying one or more wavelength channels of the optical signal for onward transmission. The ROADM 10 may route wavelength channels between the optical signal input 11, output signal output 12, add input 13 and drop output 14 using a wavelength selective switch (WSS). An optical filter 20 is positioned in the add input path 15 for filtering an optical signal received on the add input path 15 from an optical terminal 40. A reflective device 30 is positioned in, or connected to, the add input path 15. The reflective device 30 is arranged to form an optical seed signal by returning at least a portion of the optical signal received from the optical terminal. The optical seed signal is for use in seeding an optical transmitter 41 at the optical terminal 40.

The reflective device 30 is positioned in, or connected to, the add input path 15 between the optical filter 20 and the optical signal output 12. The drop output path 16 and the through signal path 18 bypass the reflective device 30.

In FIG. 4 the optical filter 20 comprises an optical wavelength division multiplex (WDM) filter, such as an Arrayed Waveguide Grating (AWG). The WDM filter may alternatively be called an optical multiplexer/demultiplexer. The WDM filter 20 has a first port 21 connected to the part of the add input path 15 leading to the ROADM 10. The WDM filter 20 is arranged to multiplex wavelengths used by different terminals in the upstream direction (i.e. from terminals 40 to the ROADM 10). The effect of the WDM filter 20 is to pass a narrow frequency band centred on the wavelength used by a particular terminal 40.

In some embodiments, the optical multiplexer/demultiplexer 20 can have a second port 22 which is connected to the drop output path 16. The WDM filter 20 is arranged to demultiplex wavelengths used by different terminals in the downstream direction (i.e. from ROADM to terminals 40). An optical isolator 17 can be positioned in the drop output path 16 between the drop output 14 of the ROADM 10 and the WDM filter 20.

Figure 5:
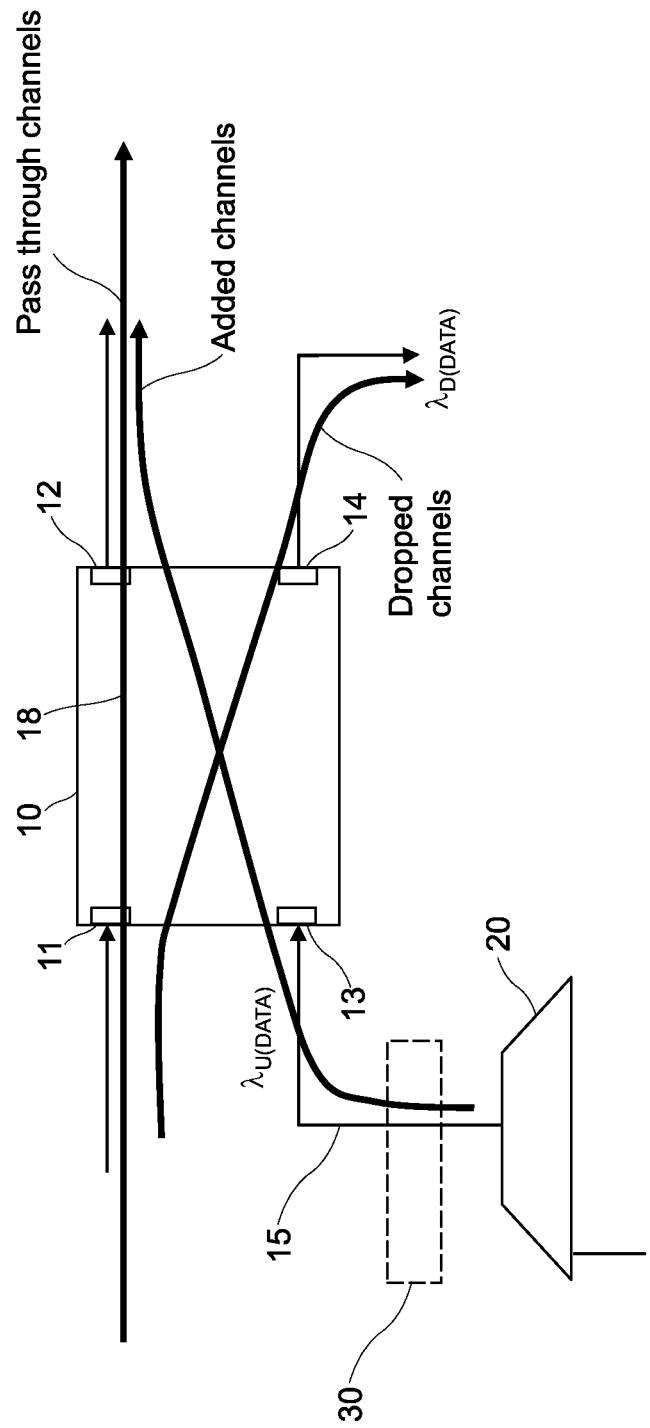
FIG. 5 shows paths in the apparatus of FIG. 4 used by pass through channels, dropped channels and added channels.

Routing of wavelength channels is shown in FIG. 5. Through channels follow the path 18 between the input port 11 and the output port 12. Dropped channels $\lambda_{D(DATA)}$ are received at the signal input port 11 and are routed along a portion of the drop output path 16 internal to the ROADM 10 to the drop signal output port 14, and along the portion of the drop output path 16 external to the ROADM 10. Added channels $\lambda_{U(DATA)}$ are received via the portion of the add input path 15 external to the ROADM 10, add input port 13 and a portion of the add input path 15 internal to the ROADM 10. An added channel is routed to output port 12 and forms part of the set of wavelength channels of the output signal.

One terminal 40 is shown in FIG. 4 but it will be appreciated that a network can comprise a plurality of terminals 40. In a wavelength division multiplexed (WDM) network, each terminal is allocated a dedicated wavelength for carrying traffic. The terms upstream and downstream will be used to simplify explanation. For this description, the term "upstream direction" describes signals flowing in the direction from the terminal 40 towards the ROADM 10 and the term "downstream direction" describes signals flowing in the direction from the ROADM 10 towards the terminal 40. Upstream and downstream wavelengths can be located in different frequency bands to one another, such as the C-band and L-band.

Referring again to FIG. 4, the process of self-seeding a terminal 40 will be described. The process is described in the Wong reference listed above, to which the skilled person is directed for further details. Self-seeding means that a terminal 40 does not require a seed signal from an external source such as Head End Equipment (HEE). Instead, a terminal 40 generates a signal which is used to seed itself. In FIG. 4, the signals $\lambda_{ASE}$ and $\lambda_{SEED}$ are the signals used in the self-seeding process. The signal $\lambda_{ASE}$ can be a noise signal, such as broadband amplified spontaneous emission (ASE) light, which is generated by a Reflective Semiconductor Optical Amplifier (R-SOA) at terminal 40. The ASE light $\lambda_{ASE}$ is transmitted upstream towards the ROADM 10 along the add input path. The ASE light $\lambda_{ASE}$ arrives at port 23 of the WDM filter 20. The WDM filter 20 has the effect of filtering the broadband ASE light as it passes through the WDM filter 20. Stated another way, the WDM filter 20 takes a spectral slice of the broadband ASE light. The filtered signal light $\lambda_{ASE(F)}$ continues upstream, from port 21, to the reflective device 30. Reflective device 30 returns at least a portion of the signal light $\lambda_{ASE(F)}$ back to the terminal 40 as an optical seed signal $\lambda_{SEED}$. Multiple reflections in the amplified cavity between terminal 40 and reflective device 30 improve the noise characteristics of the seed signal $\lambda_{SEED}$ that is directly modulated with upstream data by the R-SOA. The R-SOA 41 is directly modulated with upstream data. The modulated upstream signal is shown in FIG. 4 as $\lambda_{U(DATA)}$. In this way, the operating wavelength of a remote terminal 40 is determined by the port 23 of the WDM filter 20 that the terminal 40 is connected to.

Figure 6C:
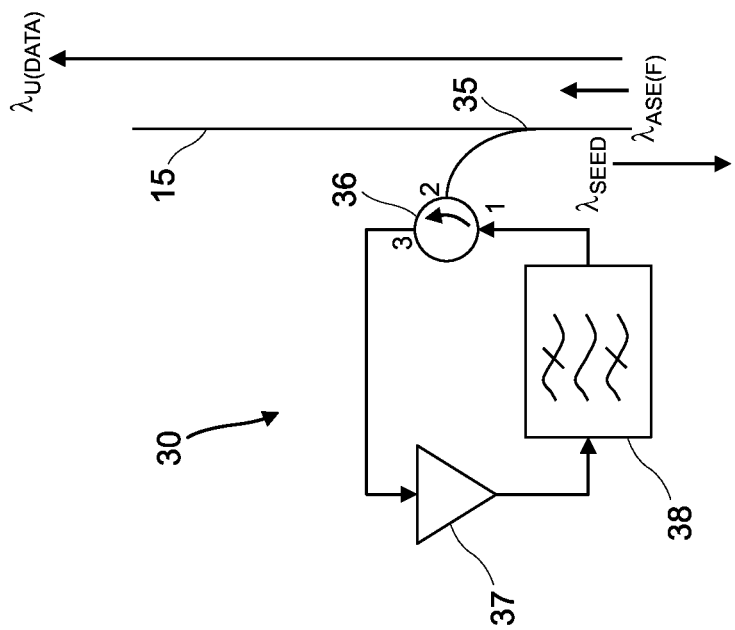
FIGS. 6A-6C show reflective devices which can be used in any of the embodiments of optical network apparatus.
Figure 6B:
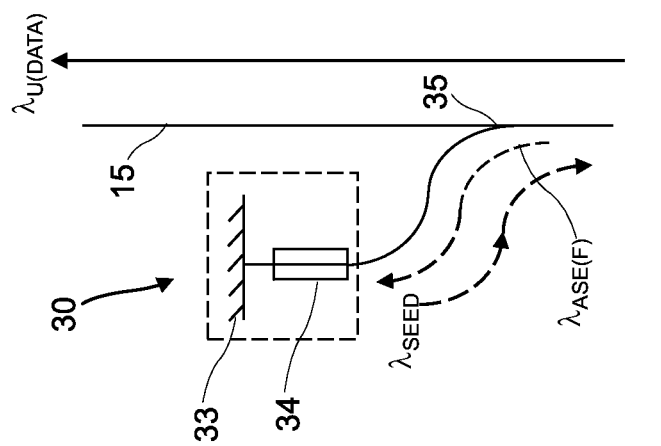
Figure 6A:
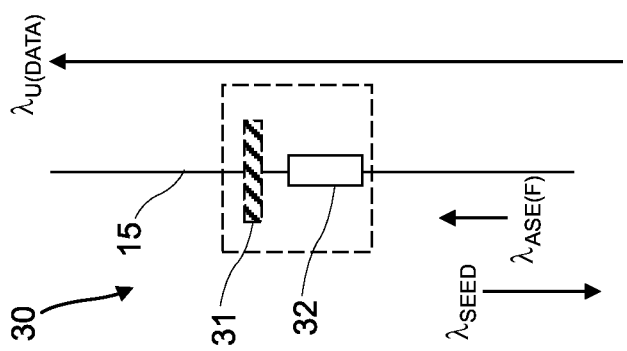

FIGS. 6A-6C show some possible configurations of the reflective device 30. In FIG. 6A the reflective device 30 comprises a partially-reflective mirror 31 positioned in the input path 15 which is arranged to reflect a portion of the filtered optical signal $\lambda_{ASE(F)}$ for return to the optical terminal 40 as an optical seed signal $\lambda_{SEED}$. Advantageously, the reflective device 30 is arranged to modify a polarisation of the optical seed signal with respect to a polarisation of the filtered optical signal. The reflective device 30 can be a Faraday Mirror, or Faraday Rotator Mirror (FRM), which comprises a combination of the partially reflective mirror 31 and a Faraday Rotator 32. A modulated upstream signal $\lambda_{U(DATA)}$ continues along the add input path 15, passing through the reflective device 30.

In FIG. 6B the reflective device 30 comprises a (fully) reflective mirror 33 which is connected to an optical coupler 35 positioned in the add input path 15. The reflective device 30 is arranged to receive a portion of the filtered optical signal $\lambda_{ASE(F)}$ received via the optical coupler 35 and to reflect the filtered optical signal for return to the optical terminal 40 via the optical coupler 35 as an optical seed signal $\lambda_{SEED}$. Advantageously, the reflective device 30 is arranged to modify a polarisation of the optical seed signal with respect to a polarisation of the filtered optical signal. The reflective device can be a Faraday Mirror, or Faraday Rotator Mirror (FRM), which comprises a combination of the mirror 33 and a Faraday Rotator 34. A modulated upstream signal $\lambda_{(DATA)}$ continues along the add input path 15.

FIG. 6C shows a further possible configuration for the reflective device 30, which is described in the Wong reference. An optical coupler 35 is positioned in the add input path 15. A loop comprises an optical circulator 36, an amplifier 37 and a bandpass filter 38. One port of the optical circulator 36 is connected to the coupler 35. The other ports of the optical circulator 36 are connected to the components of the loop. In use, a portion of the optical signal $\lambda_{ASE(F)}$ is coupled to circulator 36. The signal is amplified by amplifier 37 and filtered by filter 38 before being coupled back to the input path 15 in the downstream direction for return to the optical terminal 40 as an optical seed signal $\lambda_{SEED}$.

The Faraday Mirror, also called a Faraday Rotator Mirror (FRM), is arranged to modify, or compensate or stabilise, the polarisation of an incident optical signal. The effect of the Faraday Mirror is that an optical signal leaving the device has a different polarisation compared to the polarisation of the signal entering the device. A Faraday rotator has an effect of rotating the polarisation of an optical signal passing through the device by a fixed angle, independently of the propagation direction. Typically, the Faraday rotator is arranged to rotate the polarisation of a signal by a total of 90°, comprising a polarisation rotation of 45° during the forward passage through the device 32, 34 and a polarisation rotation of a further 45° during the return passage through the device 32, 34 after reflection by the mirror 31, 33. An advantage of the Faraday Mirror is that it can stabilise the polarisation of the optical signals used to seed the terminals 40 and therefore reduce intensity noise due to polarisation instabilities.

Figure 7:
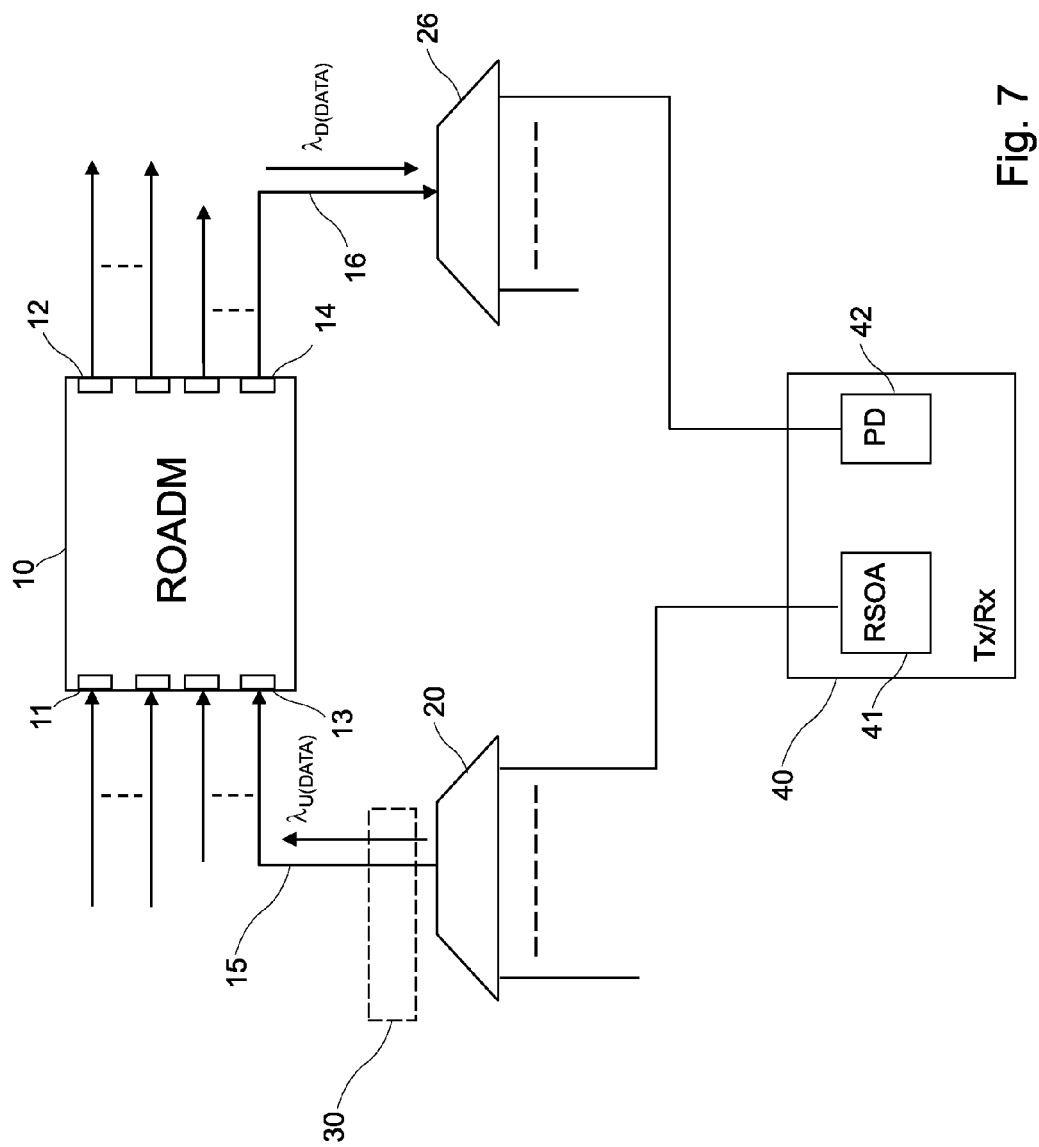
FIG. 7 shows an embodiment with an alternative configuration for paths between the OADM and terminal.

It will be appreciated that the reflective device 30 could comprise a different form of apparatus to that shown in FIGS. 6A-6C. FIG. 7 shows an alternative configuration of the network between the ROADM 10 and terminals 40. The drop output path 16 comprises a separate physical path between the ROADM 10 and receiver 42 at the terminal 40. The drop output path 16 comprises a further WDM filter 26 which serves as a demultiplexer for demultiplexing wavelength channels destined for different terminals 40.

Figure 8:
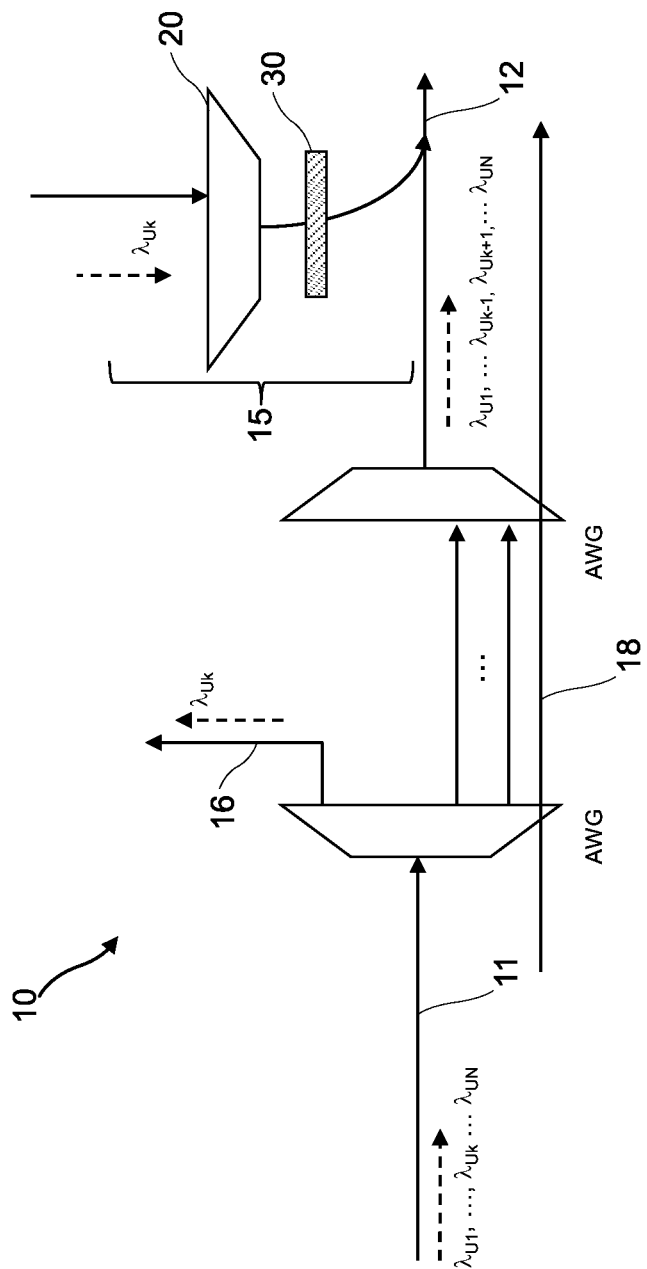
FIG. 8 shows another embodiment of optical network apparatus comprising an optical add drop multiplexer which supports self-seeding.

FIG. 8 shows another embodiment of a reconfigurable optical add drop multiplexer 10. Common reference numerals are used to indicate similar features. The ROADM 10 comprises an optical signal input 11, an optical signal output 12, an add input path 15, a drop output path 16, and a through signal path 18. An optical filter 20 is positioned in the add input path 15 for filtering an optical signal received from an optical terminal via the add input path 15. A reflective device 30 is positioned in, or connected to, the add input path 15. The reflective device 30 is arranged to form an optical seed signal by returning at least a portion of the optical signal received from the optical terminal. The reflective device 30 is positioned in the add input path 15 between the optical filter 20 and the optical signal output 12. The drop output path 16 and the through signal path 18 bypass the reflective device 30. In this embodiment the add input path connects to part of the through signal path 18 downstream of the main wavelength routing function of the ROADM 10 where wavelength channels are dropped.

Figure 9:
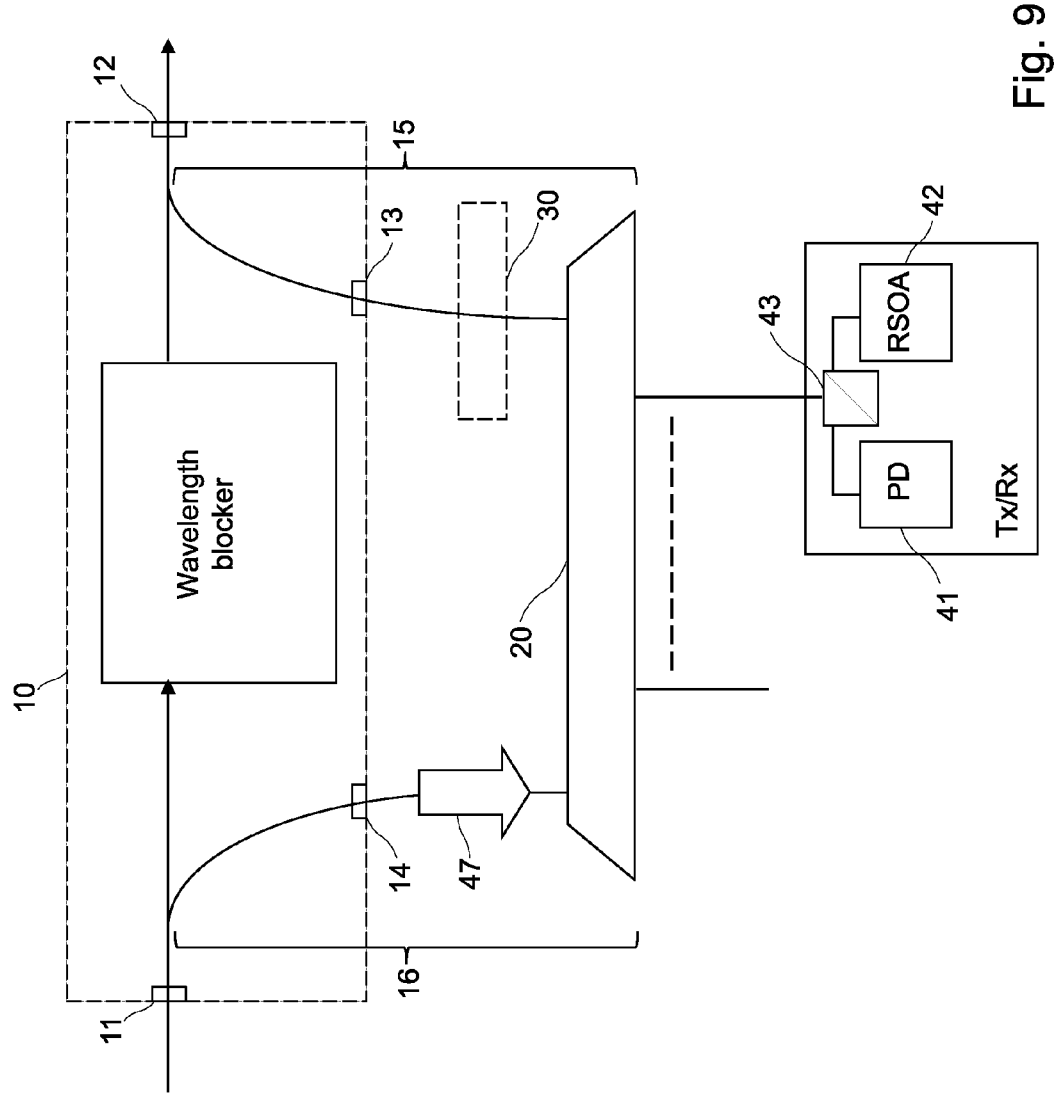
FIG. 9 shows an embodiment of optical network apparatus comprising an optical add drop multiplexer which uses a wavelength blocker.
Figure 10:
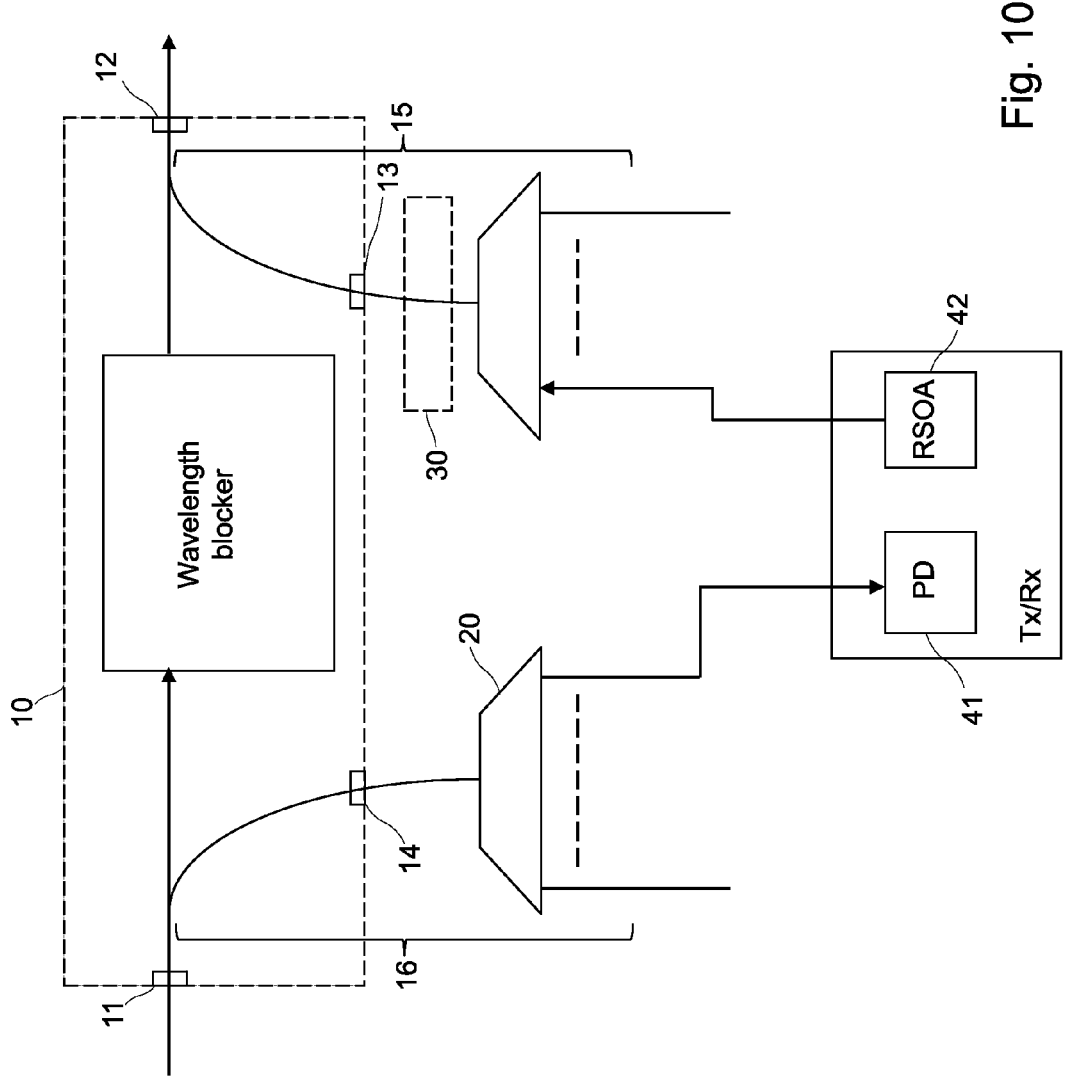
FIG. 10 shows the optical network apparatus of FIG. 9 with an alternative configuration for paths between the OADM and terminal.

FIG. 9 shows another embodiment of a reconfigurable optical add drop multiplexer 10 which is suitable for use a type of ROADM which routes wavelength channels using a wavelength blocker. Common reference numerals are used to indicate similar features. The ROADM 10 comprises an optical signal input 11, an optical signal output 12, an add input path 15, a drop output path 16, and a through signal path 18. An optical filter 20 is positioned in the add input path 15 for filtering an optical signal received from an optical terminal via the add input path 15. A reflective device 30 is positioned in, or connected to, the add input path 15. The reflective device 30 is arranged to form an optical seed signal by returning at least a portion of the optical signal received from the optical terminal. The reflective device 30 is positioned in the add input path 15 between the optical filter 20 and the optical signal output 12. The drop output path 16 and the through signal path 18 bypass the reflective device 30. In this embodiment, the drop output path 16 connects to the through signal path 18 upstream of the wavelength blocker and the add input path 15 connects to part of the through signal path 18 downstream of the wavelength blocker. The add input path 15 and drop output path 16 can be connected to a terminal 40 using a single path, as shown in FIG. 9, or by using separate paths, as shown in FIG. 10. In FIG. 9, an optical isolator 47 can be positioned in the drop output path 16 between the drop output 14 of the ROADM 10 and the optical filter 20.

Figure 11:
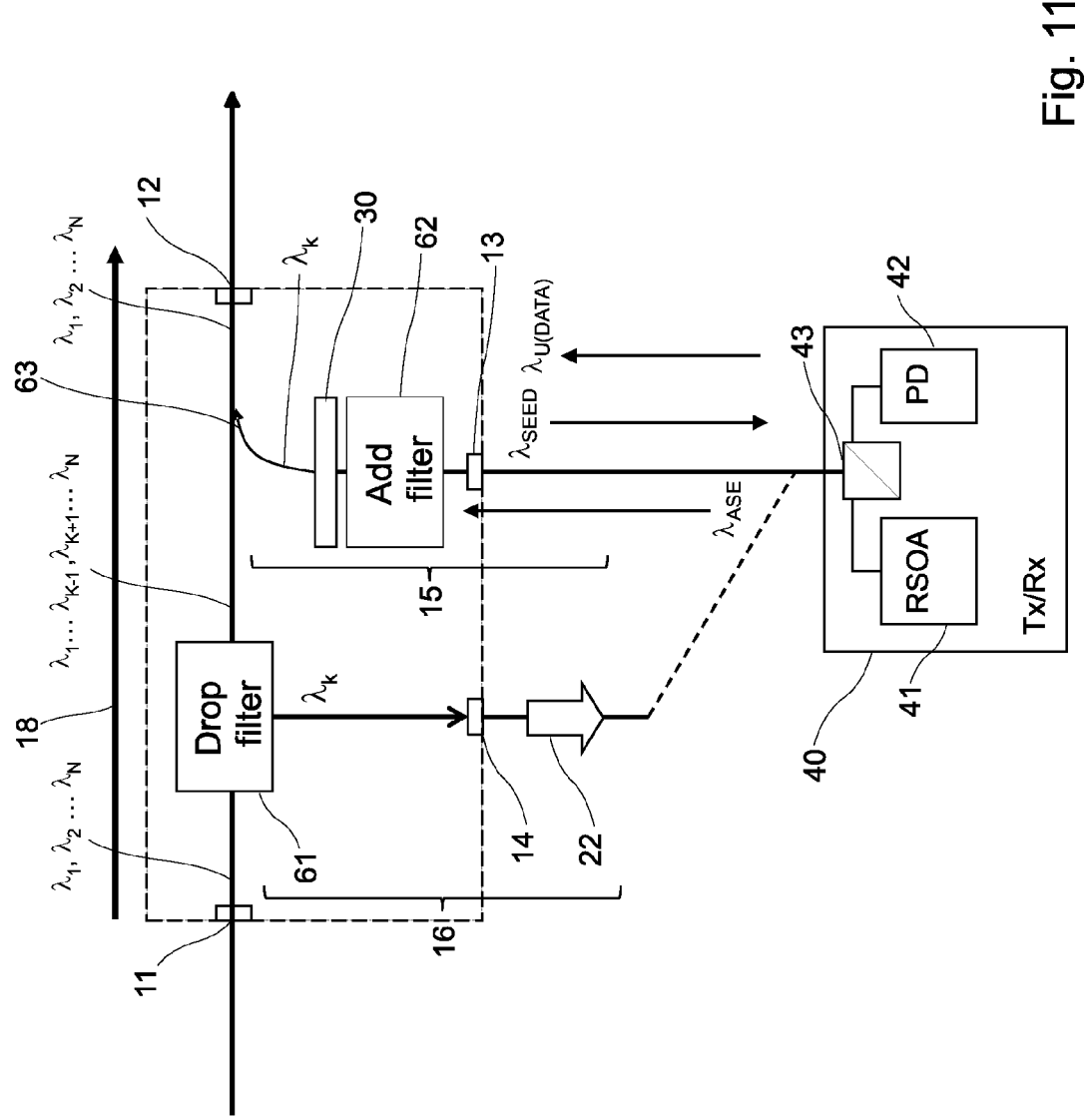
FIG. 11 shows an embodiment of an optical add drop multiplexer which supports self-seeding.

FIG. 11 shows an embodiment of a fixed OADM (FOADM) which supports self-seeding of an optical terminal 40. Common reference numerals are used to indicate similar features as other embodiments. The OADM comprises an optical signal input 11, an optical signal output 12, an add input path 15, a drop output path 16, and a through signal path 18. An optical filter 62 is positioned in the add input path 15 for filtering an optical signal received from an optical terminal 40 via the add input path 15. A reflective device 30 is positioned in, or connected to, the add input path 15. The reflective device 30 is arranged to form an optical seed signal by returning at least a portion of the optical signal received from the optical terminal 40. The reflective device 30 is positioned in the add input path 15 between the optical filter 62 and the optical signal output 12. The drop output path 16 and the through signal path 18 bypass the reflective device 30. The through signal path 18 connects between the optical signal input 11 and optical signal output 12. A drop filter 61 is positioned in the through signal path 18. The drop filter 61 is arranged to route a wavelength channel ($\lambda_k$) which is destined for terminal 40 to the drop output path 16 and drop output port 14. Other wavelengths ($\lambda_1, \ldots \lambda_{K-1}, \lambda_{K+1} \ldots \lambda_N$) are allowed to pass undisturbed along the through signal path 18 towards the optical signal output 12. The add input path 15 connects to part of the through signal path 18 downstream of the drop filter 61. A second filter 62 (or a coupler) is used to re-add the same wavelength ($\lambda_k$) carrying new traffic. The set of wavelength channels ($\lambda_1, \lambda_2, \ldots \lambda_N$) is output to the next node. Although adding and dropping one wavelength channel is described, it will be understood that the scheme can be generalised to add/drop multiple wavelengths. The drop filter 61 can be the same as the drop filter 51 shown in FIG. 2. The add filter 62 can be the same as the add filter 52 shown in FIG. 2. The purpose of the add filter 62 is to pass a channel which is to be added, and to prevent signals outside of this band from passing. In this embodiment, the add filter 62 is used in the same way as the WDM filter 20 shown in earlier embodiments. It has the effect of selecting a spectral slice of the upstream ASE signal $\lambda_{ASE}$ received from a terminal 40. The filtered ASE signal is forwarded to the reflective device 30. As before, the reflective device 30 returns at least a portion of the signal light back to the terminal 40 as an optical seed signal $\lambda_{SEED}$. The optical seed signal $\lambda_{SEED}$ is used as a seeding light which locks the transmitted wavelength of the R-SOA at terminal 40. This embodiment uses the add filter 62 to perform a filtering function at the OADM and to filter the ASE signal for self-seeding, and does not require any additional external filter. In FIG. 11, the optical filter 20 which forms a spectral slice of the optical signal received from the terminal 40 for self-seeding is the add filter 62. Fixed OADMs of the type shown in FIG. 11 can be used, for example, when it is needed to add or drop a small number of channels, and can reduce cost by avoiding the need for an external optical filter which would prohibitively increase the cost per channel.

In comparison to the conventional OADM configuration of FIG. 2, it can be seen that the add filter 62 is moved from the through path 18 to the add input path 15, together with the reflective device 30. The output of the mirror can be coupled to the through path 18 using, for example, an optical coupler 63. The optical coupler 63 can be unbalanced in order to decrease the insertion loss along the optical line.

Figure 12:
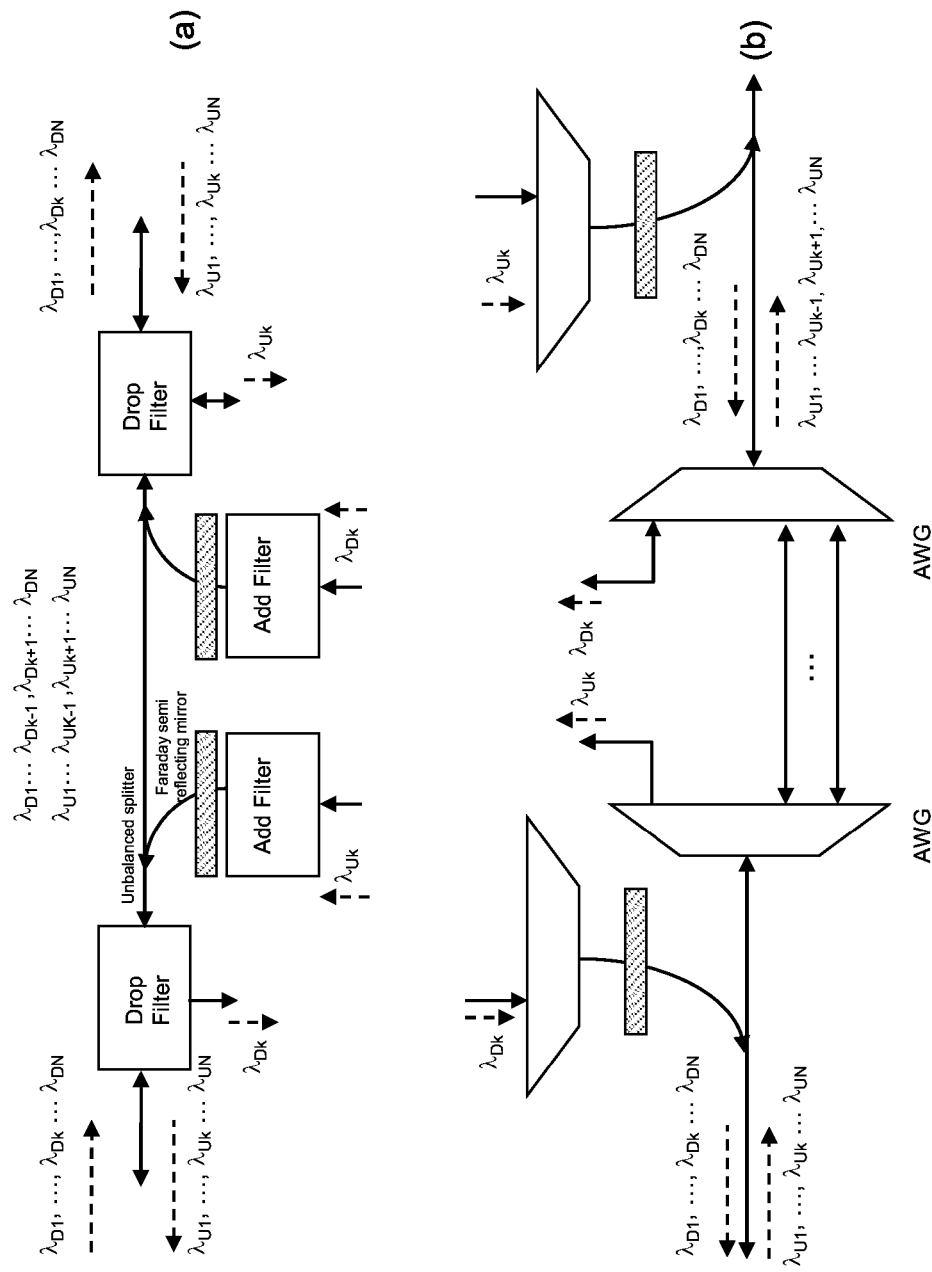
FIG. 12 show embodiments of optical add drop multiplexers which support self-seeding and bi-directional communications.

FIG. 12 shows two further embodiments of OADMs which support bi-directional communication around a mesh, ring or other network topology. FIG. 12(a) is the same as FIG. 11, with an additional drop filter, add filter and reflective device for a second transmission direction. FIG. 12(b) is the same as FIG. 8, with an additional WDM filter and reflective device for a second transmission direction. In FIG. 12, channels associated with the first transmission direction are labelled with a "D" suffix, i.e. ($\lambda_{D1}, \lambda_{D2}, \ldots$) and channels associated with the second transmission direction are labelled with a "U" suffix, i.e. ($\lambda_{U1}, \lambda_{U2}, \ldots$).

Figure 13:
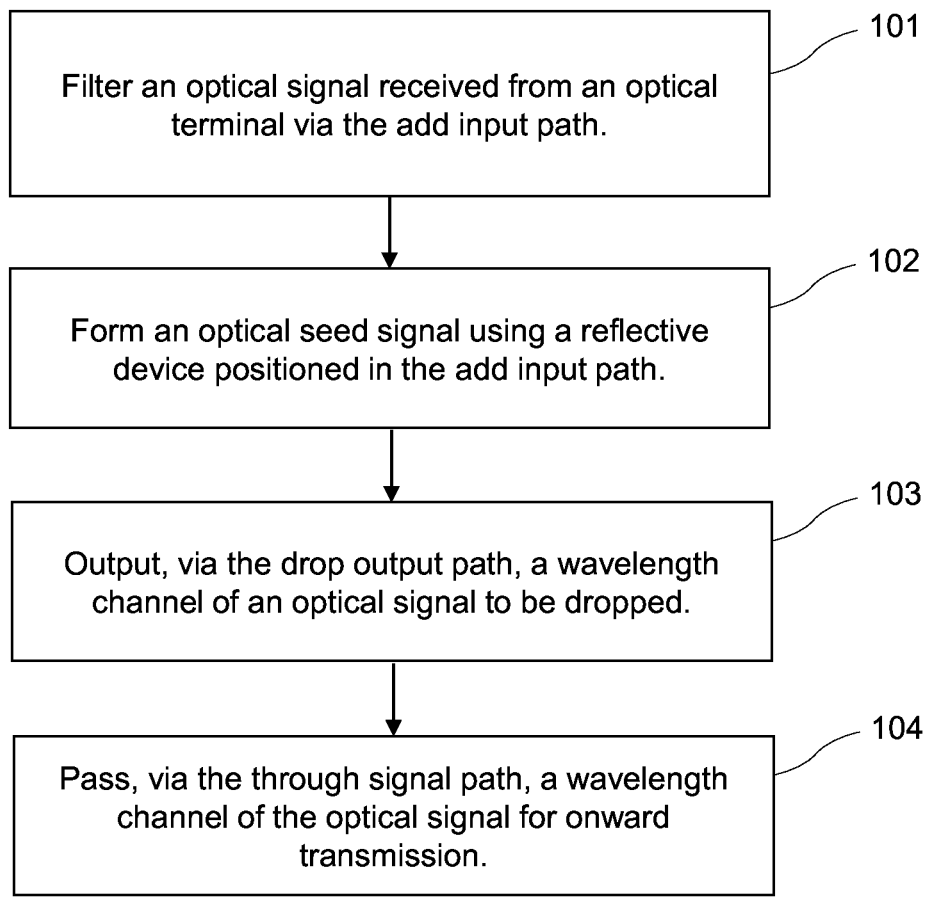
FIG. 13 shows a method of processing optical signals at optical network apparatus or an optical add drop multiplexer.

FIG. 13 shows a method which can be performed at any of the OADMs described above. Step 101 comprises filtering an optical signal received from an optical terminal via the add input path to form a filtered optical signal. Step 102 comprises forming an optical seed signal using a reflective device positioned in, or connected to, the add input path by returning at least a portion of the filtered optical signal. The optical seed signal is for use in seeding an optical transmitter at the optical terminal. Step 103 comprises outputting, via the drop output path, a wavelength channel of an optical signal to be dropped. Step 104 comprises passing, via the through signal path, a wavelength channel of the optical signal for onward transmission. In this method, the outputting, via the drop output path of the wavelength channel of the optical signal to be dropped and the passing via the through signal path of the wavelength channel of the optical signal for onward transmission bypass the reflective device.

Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. Optical network apparatus comprising:
   an optical add drop multiplexer comprising an optical signal input for receiving an optical input signal comprising at least one wavelength channel, an optical signal output for outputting an optical signal for onward transmission and a through signal path connected between the optical signal input and the optical signal output for carrying a wavelength channel of the optical signal for onward transmission;
   an add input path connected to the optical signal output for receiving a wavelength channel to be added;
   a drop output path connected to the optical signal input for outputting a wavelength channel to be dropped;
   an optical filter positioned in the add input path for filtering an optical signal received on the add input path from an optical terminal to form a filtered optical signal;
   a reflective device positioned in, or connected to, the add input path arranged to form an optical seed signal by returning at least a portion of the filtered optical signal, the optical seed signal for use in seeding an optical transmitter at the optical terminal, wherein the reflective device is positioned between the optical filter and the optical signal output and wherein the drop output path and the through signal path bypass the reflective device.

2. Optical network apparatus according to claim 1 wherein the optical filter comprises an optical wavelength division multiplex filter having a first port connected to the add input path, wherein the reflective device is positioned in the add input path between the optical wavelength division multiplex filter and the optical add drop multiplexer.

3. Optical network apparatus according to claim 2 wherein the optical wavelength division multiplex filter has a second port which is connected to the drop output path.

4. Optical network apparatus according to claim 3 further comprising an optical isolator positioned in the drop output path between the optical add drop multiplexer and the optical wavelength division multiplex filter.

5. Optical network apparatus according to claim 1 wherein the reflective device is arranged to modify a polarisation of the optical seed signal with respect to a polarisation of the filtered optical signal.

6. Optical network apparatus according to claim 5 wherein the reflective device comprises one of:

a partially-reflective device positioned in the add input path which is arranged to reflect a portion of the filtered optical signal for return to the optical terminal as the optical seed signal;

a reflective device which is connected to an optical coupler positioned in the add input path, wherein the reflective device is arranged to reflect the filtered optical signal for return to the optical terminal via the optical coupler as the optical seed signal.

7. Optical network apparatus according to claim 6 wherein the partially-reflective device comprises a partially-reflective Faraday mirror and the reflective device comprises a Faraday mirror.

8. Optical network apparatus according to claim 1 wherein the optical add drop multiplexer is a reconfigurable optical add drop multiplexer.

9. Optical network apparatus according to claim 1 wherein the optical add drop multiplexer comprises an add filter arranged to pass a selected wavelength channel for adding to the optical signal for onward transmission, wherein the optical filter is the add filter.

10. Optical network apparatus according to claim 9 wherein the through path for the optical signal for onward transmission bypasses the add filter.

11. Optical network apparatus according to claim 1 further comprising an optical terminal with a transmitter arranged to transmit an optical signal to the add input path and to receive an optical seed signal for use in seeding the transmitter.

12. Optical network apparatus according to claim 11 wherein the optical terminal further comprises a receiver arranged to receive an optical signal via the drop output path.

13. An optical add drop multiplexer comprising:
an optical signal input for receiving an optical input signal comprising at least one wavelength channel;
an optical signal output for outputting an optical signal for onward transmission;
a through signal path connected between the optical signal input and the optical signal output for carrying a wavelength channel of the optical signal for onward transmission;
an add input path connected to the optical signal output for receiving a wavelength channel to be added;
a drop output path connected to the optical signal input for outputting a wavelength channel to be dropped;
an optical filter positioned in the add input path for filtering an optical signal received on the add input path from an optical terminal to form a filtered optical signal;

a reflective device positioned in, or connected to, the add input path arranged to form an optical seed signal by returning at least a portion of the filtered optical signal, the optical seed signal for use in seeding an optical transmitter at the optical terminal, wherein the reflective device is positioned between the optical filter and the optical signal output and wherein the drop output path and the through signal path bypass the reflective device.

14. A method of processing optical signals at optical network apparatus comprising an optical add drop multiplexer, the optical add drop multiplexer comprising an optical signal input for receiving an optical input signal comprising at least one wavelength channel, an optical signal output for outputting an optical signal for onward transmission and a through signal path connected between the optical signal input and the optical signal output for carrying a wavelength channel of the optical signal for onward transmission, the optical network apparatus further comprising an add input path connected to the optical signal output for receiving a wavelength channel to be added and a drop output path connected to the optical signal input for outputting a wavelength channel to be dropped, the method comprising:
filtering an optical signal received on the add input path from an optical terminal to form a filtered optical signal;
forming an optical seed signal using a reflective device positioned in, or connected to, the add input path by returning at least a portion of the filtered optical signal, the optical seed signal for use in seeding an optical transmitter at the optical terminal, wherein the reflective device is positioned between the optical filter and the optical signal output;
outputting, via the drop output path, a wavelength channel of an optical signal to be dropped;
passing, via the through signal path, a wavelength channel of the optical signal for onward transmission;
wherein the outputting, via the drop output path, of the wavelength channel of the optical signal to be dropped and the passing, via the through signal path, of the wavelength channel of the optical signal for onward transmission bypass the reflective device.

15. A method according to claim 14 wherein the step of forming an optical seed signal comprises modifying a polarisation of the optical seed signal with respect to a polarisation of the filtered optical signal.

\* \* \* \* \*